United States Patent
Grotendorst

(10) Patent No.: US 7,644,212 B2
(45) Date of Patent: Jan. 5, 2010

(54) COMMUNICATION AND/OR CONTROL APPARATUS AND METHOD FOR DETECTING LOCKING STATES IN SAME

(75) Inventor: Jörg Grotendorst, Garbsen (DE)

(73) Assignee: Continental Aktiengesellschaft, Hannover (DE)

( * ) Notice: Subject to any disclaimer, the term of this patent is extended or adjusted under 35 U.S.C. 154(b) by 628 days.

(21) Appl. No.: 11/587,628

(22) PCT Filed: Feb. 11, 2005

(86) PCT No.: PCT/EP2005/050606

§ 371 (c)(1),
(2), (4) Date: Oct. 27, 2006

(87) PCT Pub. No.: WO2005/107171

PCT Pub. Date: Nov. 10, 2005

(65) Prior Publication Data

US 2008/0022025 A1 Jan. 24, 2008

(30) Foreign Application Priority Data

Apr. 29, 2004 (DE) .................. 10 2004 022 132

(51) Int. Cl.
*G06F 11/00* (2006.01)
(52) U.S. Cl. ..................... 710/200; 714/39; 709/224
(58) Field of Classification Search .................. 714/4, 714/39, 43; 709/224; 710/200
See application file for complete search history.

(56) References Cited

U.S. PATENT DOCUMENTS

| 5,485,461 | A | * | 1/1996 | Asgari ..................... 370/252 |
| 5,491,479 | A | * | 2/1996 | Wilkinson ................. 341/58 |
| 6,292,910 | B1 | | 9/2001 | Cummins |
| 6,941,367 | B2 | * | 9/2005 | Vosseler et al. ........... 709/224 |
| 2002/0059545 | A1 | * | 5/2002 | Nakashima et al. ......... 714/43 |

FOREIGN PATENT DOCUMENTS

| DE | 101 60 348 | 6/2003 |
| DE | 102 40 669 | 3/2004 |
| JP | 11 163905 | 6/1999 |

* cited by examiner

*Primary Examiner*—Paul R Myers

(57) ABSTRACT

A method for detecting locking states in communication and/or control appliances ($SG_i$) dispersedly networked together by a data bus (2) compares a message currently transmitted by a communication and/or control appliance ($SG_i$) to a previously transmitted message. It determines and the absence of a locking state of the communication and/or control appliance ($SG_i$) if the messages are different. A message counter is encoded in the transmitted message if the messages are identical and decodes the message counter in a communication and/or control appliance ($SG_i$) receiving the message. It determines the absence of a locking state at the communication and/control appliance ($SG_i$) if the value of the message counter has changed relative to a previous value of the message counter of a previously transmitted message and determines a locking state of the communication and/or control appliance ($SG_i$) if the message counter value has not changed after a specific waiting time ($t_w$).

4 Claims, 1 Drawing Sheet

COMMUNICATION AND/OR CONTROL APPARATUS AND METHOD FOR DETECTING LOCKING STATES IN SAME

BACKGROUND OF THE INVENTION

The invention relates to a method for detecting locking states in communication and/or control apparatuses which are networked to one another in a distributed manner using a data bus.

The invention also relates to a communication and/or control apparatus having an interface for connection to a data bus and networking to further communication and/or control apparatuses.

In complex technical systems in which communication and/or control apparatuses are networked to one another via a data bus, the readiness to transmit and the functionality of the communication and/or control apparatuses must be regularly monitored. This is indispensable, in particular, for safety-critical applications in motor vehicles, for example airbag control apparatuses etc.

To this end, it is first of all possible to evaluate whether messages are regularly transmitted by the communication and/or control apparatuses.

However, a problem arises when the communication and/or control apparatuses are in a locking state and transmit messages even though the communication and/or control apparatus is blocked and can no longer perform its actual task. A locking state is a state in which two processes which are respectively assigned an operating means are waiting for the respective other process to enable the operating means, for example, and both processes thus block one another. Although they are thus still able to regularly transmit messages, they are blocked from carrying out the actual process.

JP 11163905 A discloses a method for the multiplexed transmission of data via a data bus in a motor vehicle, in which changes in the data are detected and are indicated using an update bit.

JP 11163903 A also discloses a method for the multiplexed transmission of data via a data bus in a motor vehicle, in which the connection of a communication unit of the calling subscriber to the data bus is detected and the data are only then transmitted.

In the conventional methods, locking states are detected by concomitantly transmitting, together with the message to be transmitted, a monitoring signal from the transmitter, for example a message counter. This additional information is not used to transmit function contents or function signals but merely for monitoring purposes in order to be able to detect a possible locking state of the transmitting communication and/or control apparatus in a communication and/or control apparatus that receives the message. This additional information disadvantageously increases the length of the message and disadvantageously increases the data bus utilization level.

Therefore, it is an object of the invention to provide an improved method for detecting locking states in communication and/or control apparatuses which are networked to one another in a distributed manner using a data bus, the utilization level of the data bus being intended to be reduced by reducing the length of the message.

It is also an object of the invention to provide a correspondingly improved communication and/or control apparatus.

SUMMARY OF THE INVENTION

The object is achieved with the method of the generic type by means of the following steps:

a message which is currently being transmitted by a transmitting communication and/or control apparatus is compared with a previously transmitted message, and it is determined that there is no locking state in the transmitting communication and/or control apparatus if the messages are different, and the transmitting communication and/or control apparatus codes a message counter into the actual message being transmitted if the messages are the same, and the message counter is decoded in a communication and/or control apparatus that receives the message, and it is determined that there is no locking state in the transmitting communication and/or control apparatus if the value of the message counter has changed in comparison with a previous value of the message counter in a previously transmitted message, and a locking state in the transmitting communication and/or control apparatus is determined if the value of the message counter has not changed after a defined waiting time.

Instead of the previous additional information, it is thus now proposed to first of all check the changes in the message from one transmission sequence to the next. If the message changes, the transmitting communication and/or control apparatuses cannot be in a locking state (deadlock). If the message contents are constant on account of the operating state, a message counter is preferably coded into the actual message being transmitted after a defined or variable initiation time, so that the message area for an additional signal can be dispensed with. A locking state can then be detected by decoding the message counter and evaluating the latter.

The message counter is preferably coded into the message by changing the coding for a defined bit section of the digital message. If a change in the coding is detected in the particular bit section, the message being transmitted is correct and the communication and/or control apparatus is not in a locking state. Otherwise, if there is no change in the coding in the particular bit section, it can be concluded, after a defined waiting time, that a locking state is present.

BRIEF DESCRIPTION OF THE DRAWINGS

The invention will be explained in more detail below with reference to the accompanying drawings, in which.

DETAILED DESCRIPTION OF THE DRAWINGS

Figure 1:
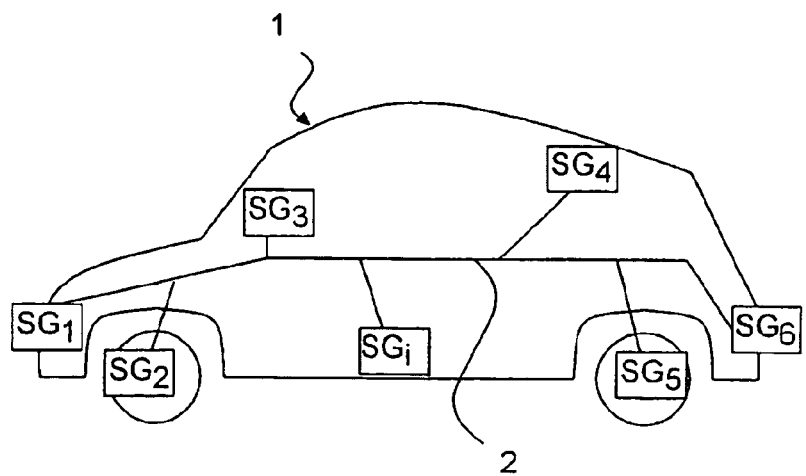
FIG. 1 shows a sketch of a motor vehicle having a data bus and distributed communication and/or control apparatuses.

FIG. 1 reveals a sketch of a motor vehicle 1 having a data bus 2 to which a multiplicity of communication and/or control apparatuses $SG_i$ (where i=1 ... N) are connected. Such communication and/or control apparatuses $SG_i$ may be, for example, airbag control apparatuses, wheel sensors, antilock braking system control apparatuses or the like. Since these communication and/or control apparatuses $SG_i$ are critical to safety under certain circumstances, their operational capability must be continuously monitored. In particular, locking states in which processes which are carried out or monitored by the communication and/or control apparatuses $SG_i$ block one another are critical to safety.

Figure 2:
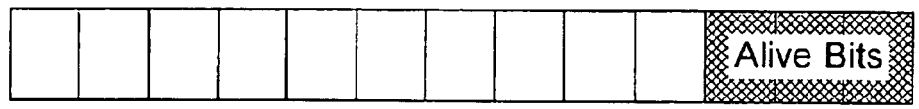
FIG. 2 shows a signal block of a message which is being transmitted and has additional information for identifying a possible locking state.

FIG. 2 reveals a signal block for transmitting a message together with an item of additional information in a conventional manner, for example in the form of a message counter. The additional information in the form of alive bits, which are not used to transmit function signals, is used to monitor the functionality of the transmitting communication and/or control apparatus $SG_i$.

Figure 3:
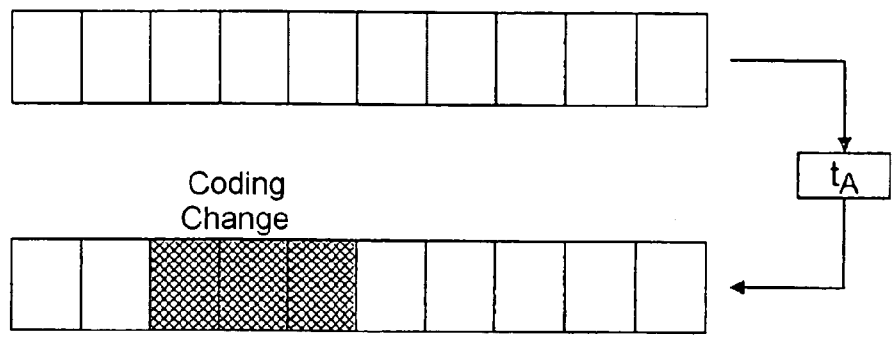
FIG. 3 shows signal blocks of a message which is being transmitted and has a message counter coded into the message after an initiation time has elapsed.

FIG. 3 reveals signal blocks as are used in the inventive method for detecting locking states.

A signal block comprises only the actual message being transmitted, if appropriate with additional control information but without alive bits for monitoring the functionality of the transmitting communication and/or control apparatus $SG_i$.

In a step which is continuously repeated, the message which is currently transmitted by a transmitting communication and/or control apparatus $SG_i$ is compared with a previously transmitted message. If the messages are different, it is not possible for a locking state to be present in the transmitting communication and/or control apparatus $SG_i$.

If the messages are the same, the transmitting communication and/or control apparatus codes a message counter into the actual message being transmitted after an initiation time $t_A$ has elapsed.

Since the message can be the same an account of a system state that remains the same or on account of a locking state, the message counter is subsequently monitored. To this end, the message counter is decoded in the communication and/or control apparatus $SG_i$ that receives the message and, if the message counter changes, it is determined that there is no locking state in the transmitting communication and/or control apparatus $SG_i$. Otherwise, a locking state in the transmitting communication and/or control apparatus $SG_i$ is detected after a defined waiting time.

The message counter is coded into the message by changing the coding for a defined bit section. If a change in the coding for the particular bit section is detected by the receiving communication and/or control apparatus $SG_i$, there is no locking state. Otherwise it can be concluded, after a defined waiting time $t_w$, that there is a locking state.

The invention claimed is:

1. A method for detecting locking states in electronic devices ($SG_i$) which are networked to one another in a distributed manner using a data bus (2), comprising the following steps:
    comparing a current message, which is transmitted by at least one of the electronic devices ($SG_i$) with a previously transmitted message;
    determining that there is no locking state in the transmitting electronic device ($SG_i$) if the messages are different;
    in the transmitting electronic device, coding a message counter into the actual message being transmitted if the messages are the same;
    decoding the message counter in the electronic device ($SG_i$) that receives the message;
    determining that there is no locking state in the transmitting electronic device ($SG_i$) if the value of the message counter has changed in comparison with a previous value of the message counter in a previously transmitted message, and
    determining a locking state in the transmitting electronic device ($SG_i$) if the value of the message counter has not changed after a defined waiting time ($t_w$).

2. The method as claimed in claim 1, characterized in that the message counter is coded after a defined initiation time ($t_A$).

3. The method as claimed in claim 1, wherein the message is a digital message and message counter is coded into the message by changing the coding for a defined bit section of the digital message.

4. An electronic device ($SG_i$) capable of communicating with other electronic devices by means of digital messages via a data bus (2), the electronic device being set up to code a message counter into a message being transmitted if the message is the same as a previous one transmitted by the electronic device and to decode from a received message a message counter previously coded into the received message by another electronic device.

* * * * *